US008749701B2

(12) United States Patent
Hwang et al.

(10) Patent No.: US 8,749,701 B2
(45) Date of Patent: Jun. 10, 2014

(54) DIGITAL PHOTOGRAPHING APPARATUS AND METHOD OF CONTROLLING POWER OF THE DIGITAL PHOTOGRAPHING APPARATUS

(75) Inventors: Soon-hoon Hwang, Seoul (KR); Hyun-doc Seo, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 57 days.

(21) Appl. No.: 13/473,790

(22) Filed: May 17, 2012

(65) Prior Publication Data
US 2012/0293709 A1    Nov. 22, 2012

(30) Foreign Application Priority Data

May 17, 2011    (KR) .......................... 10-2011-0046452

(51) Int. Cl.
*H04N 5/225*    (2006.01)
(52) U.S. Cl.
USPC ......................................................... 348/372

(58) Field of Classification Search
USPC ................................... 348/207.1, 211.1, 372
See application file for complete search history.

(56) References Cited

U.S. PATENT DOCUMENTS

| 8,238,420 | B1 * | 8/2012 | Shankarappa | ........... 375/240.02 |
| 2002/0191079 | A1 * | 12/2002 | Kobayashi et al. | ......... 348/207.1 |
| 2003/0007080 | A1 * | 1/2003 | Taniguchi et al. | ....... 348/231.99 |
| 2008/0180551 | A1 * | 7/2008 | Koike | ...................... 348/231.99 |
| 2010/0253644 | A1 * | 10/2010 | Lee et al. | ...................... 345/173 |

\* cited by examiner

*Primary Examiner* — Gevell Selby
(74) *Attorney, Agent, or Firm* — Drinker Biddle & Reath LLP

(57) ABSTRACT

A digital photographing apparatus and a method of controlling power of the digital photographing apparatus so as to reduce power consumption of the digital photographing apparatus by analyzing image frames that are compressed and transmitted and then by determining a screen change in the image frames, when the digital photographing apparatus is remotely controlled.

18 Claims, 5 Drawing Sheets

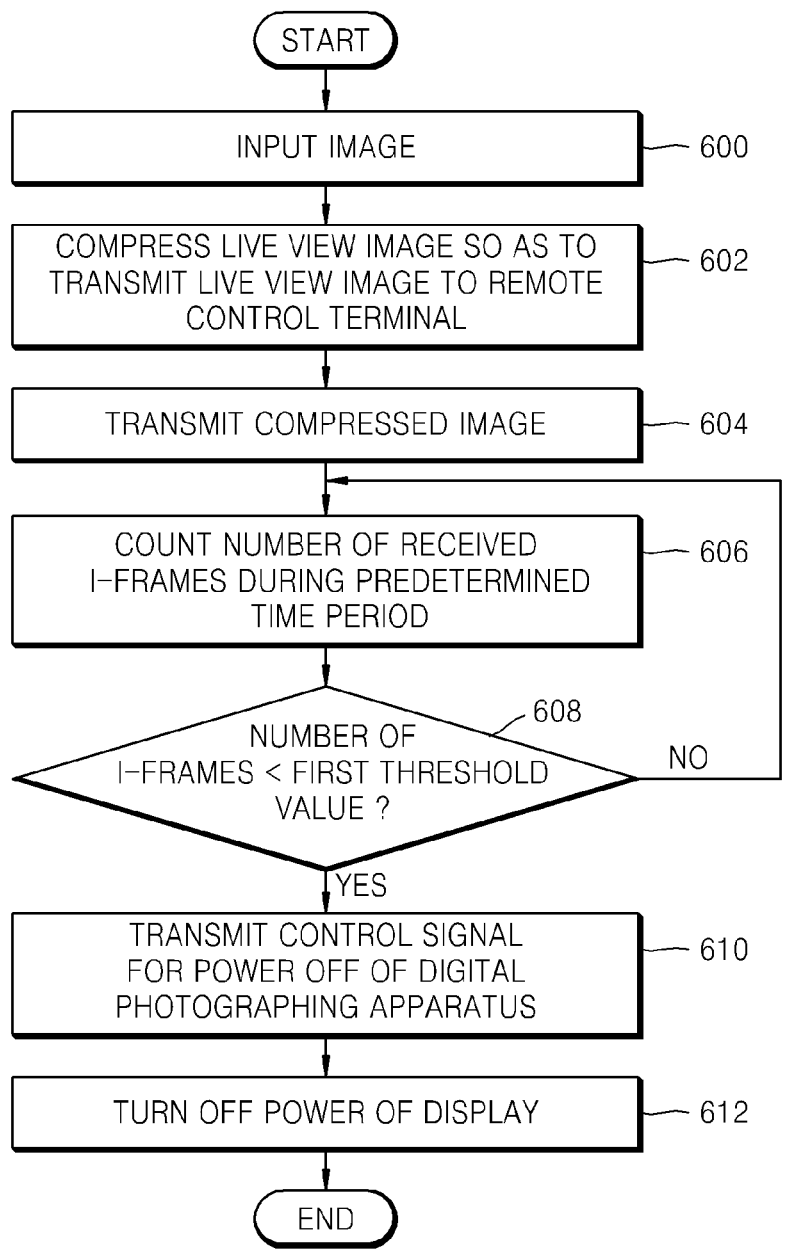

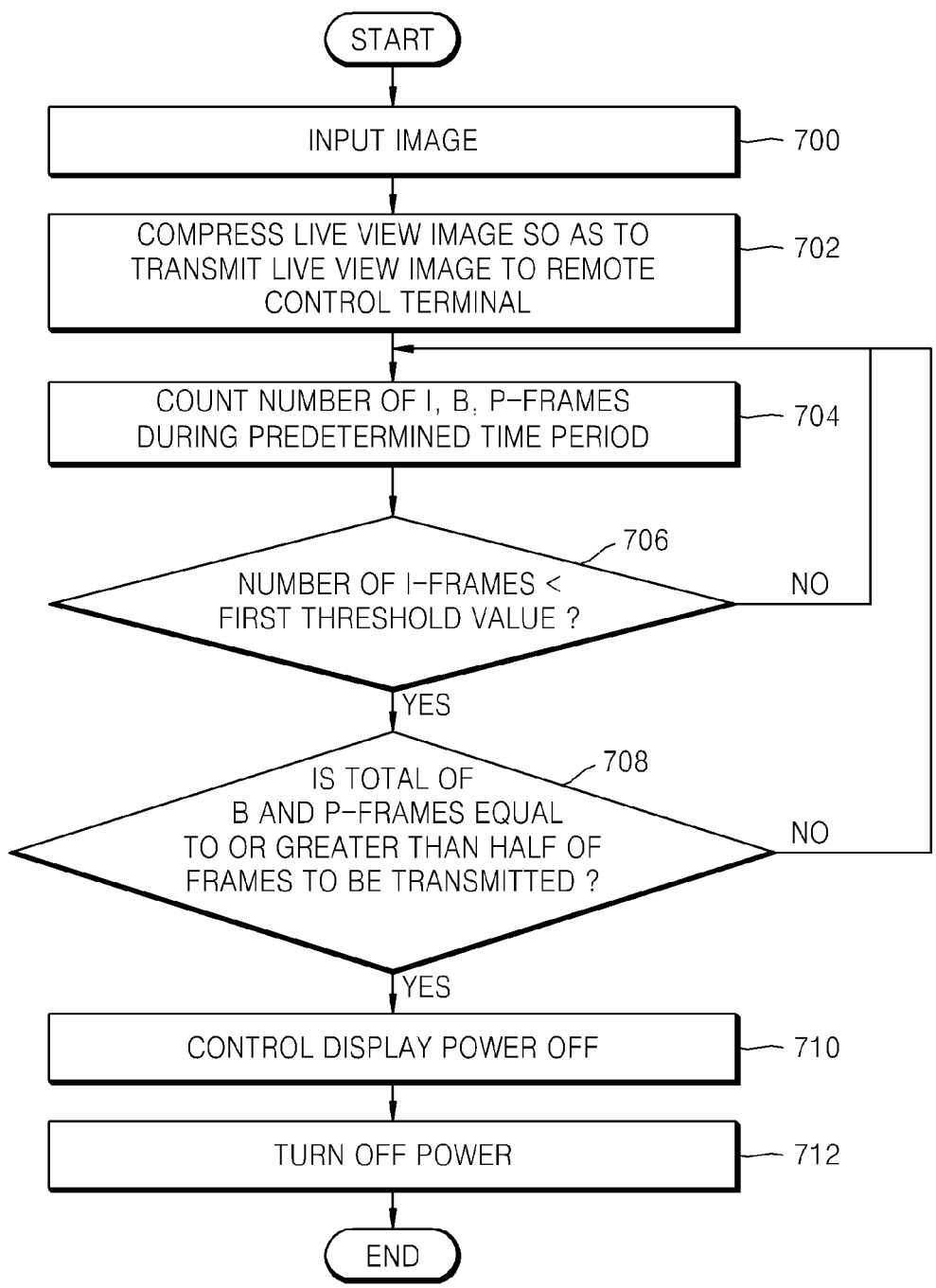

DIGITAL PHOTOGRAPHING APPARATUS AND METHOD OF CONTROLLING POWER OF THE DIGITAL PHOTOGRAPHING APPARATUS

CROSS-REFERENCE TO RELATED PATENT APPLICATION

This application claims the priority benefit of Korean Patent Application No. 10-2011-0046452, filed on May 17, 2011, in the Korean Intellectual Property Office, the disclosure of which is incorporated herein in its entirety by reference.

BACKGROUND

1. Field

Embodiments relate to a digital photographing apparatus and a method of controlling power of the digital photographing apparatus.

2. Description of the Related Art

Recently, a function referred to as a remote viewfinder, a live shutter, or a remote shutter through which a camera is remotely controlled in conjunction with a portable terminal such as a mobile phone or a smart phone has been implemented. In the remote control, the camera is linked with the portable terminal, a live view image is simultaneously displayed on a display of the camera and a display of the portable terminal, and then a user may perform photographing while the user views a screen of the portable terminal.

SUMMARY

Embodiments include a digital photographing apparatus and a method of controlling power of the digital photographing apparatus so as to reduce power consumption of the digital photographing apparatus by analyzing image frames that are compressed and transmitted and then by determining a screen change in the image frames, when the digital photographing apparatus is remotely controlled.

According to an embodiment, a method of controlling power of a digital photographing apparatus for photographing a target object according to a control signal from a remote control terminal includes the operations of compressing an input image of the target object; detecting a number of I-frames from among frames of the compressed input image; and controlling the power of the digital photographing apparatus based on the number of I-frames.

The method may further include the operation of determining whether the number of I-frames is less than a first threshold value, wherein, when the number of I-frames is less than the first threshold value, the controlling comprises turning off a display of the digital photographing apparatus.

When the number of I-frames is less than the first threshold value, the operation of controlling may include the operations of generating a power off control signal for turning off the display of the digital photographing apparatus; and turning off the display according to the power off control signal.

The method may further include the operations of transmitting the compressed input image to the remote control terminal using the digital photographing apparatus; detecting the number of I-frames from among the frames of the compressed input image in a first time period using the remote control terminal; generating a power off control signal for turning off a display of the digital photographing apparatus when the number of I-frames is less than a first threshold value; transmitting the power off control signal to the digital photographing apparatus; and turning off the display according to the power off control signal.

The operation of detecting may include the operation of detecting the number of I-frames from among the frames of the compressed input image in a first time period.

The operation of detecting may include the operation of detecting a number of at least one of I-frames, P-frames, and B-frames from among the frames of the compressed input image in a first time period, and the operation of controlling may include the operation of controlling the power of the digital photographing apparatus based on the number of the at least one of I-frames, P-frames, and B-frames.

The method may further include the operations of determining whether the number of I-frames is less than a first threshold value; and determining whether a total of the number of P-frames and the number of B-frames is less than a second threshold value, and wherein, when the number of I-frames is less than the first threshold value and the total of the number of P-frames and the number of B-frames is less than the second threshold value, the controlling comprises turning off a display of the digital photographing apparatus.

The second threshold value may be determined according to a rate of frames to be transmitted to the remote control terminal.

The method may further include the operation of determining whether the total of the number of P-frames and the number of B-frames in a second time period that is greater than the first time period is greater than or equal to a third threshold value, and when the total of the number of P-frames and the number of B-frames in the second time period is greater than or equal to the third threshold value, the operation of controlling may include the operation of turning off the display of the digital photographing apparatus.

The input image may include a live view image.

The method may further include the operation of photographing the target object according to a photographing signal from the remote control terminal.

According to another embodiment, a digital photographing apparatus for photographing a target object according to a control signal from a remote control terminal includes a digital signal processing (DSP) unit that detects a number of I-frames from among frames of an image obtained by compressing an input image of the target object, and that controls power of the digital photographing apparatus based on the number of I-frames.

The DSP unit may include a compression frame detecting unit that detects the number of I-frames from among the frames of the image obtained by compressing the input image of the target object; a determining unit that determines whether the number of I-frames is less than a first threshold value; and a display control unit that turns off a display of the digital photographing apparatus when the number of I-frames is less than the first threshold value.

The digital photographing apparatus may further include a communication module that transmits the compressed input image to the remote control terminal, and that receives a remote control signal from the remote control terminal. The remote control terminal may detect the number of I-frames from among the frames of the compressed input image received in a predetermined time period, generate a power off control signal for powering off a display of the digital photographing apparatus when the number of I-frames is less than a first threshold value, and transmit the power off control signal to the digital photographing apparatus as the remote control signal. The DSP unit may turn off the display according to the power off control signal.

The compression frame detecting unit may detect the number of I-frames from among the frames of the compressed input image in a first time period.

The compression frame detecting unit may detect a number of at least one of I-frames, P-frames, and B-frames from among the frames of the compressed input image in a first time period, the determining unit may determine whether the number of I-frames is less than the first threshold value, and may determine whether a total of the number of P-frames and the number of B-frames is less than a second threshold value, and the display control unit may turn off the display of the digital photographing apparatus when the number of I-frames is less than the first threshold value and the total of the number of P-frames and the number of B-frames is less than the second threshold value.

The second threshold value may be determined according to a rate of frames to be transmitted to the remote control terminal.

The determining unit may determine whether the total of the number of P-frames and the number of B-frames in a second time period that is greater than the first time period is greater than or equal to a third threshold value, and when the total of the number of P-frames and the number of B-frames is greater than or equal to the third threshold value, the display control unit may turn off the display of the digital photographing apparatus.

The input image may include a live view image.

According to another embodiment, a non-transitory recording medium has recorded thereon a program for executing the method on a computer.

BRIEF DESCRIPTION OF THE DRAWINGS

The above and other features and advantages will become more apparent by describing in detail exemplary embodiments with reference to the attached drawings in which:

FIG. 6 is a flowchart for describing a method of controlling power of the digital photographing apparatus of FIG. 1, according to another embodiment; and FIG. 7 is a flowchart for describing a method of controlling power of the digital photographing apparatus of FIG. 1, according to another embodiment.

DETAILED DESCRIPTION

Figure 1:
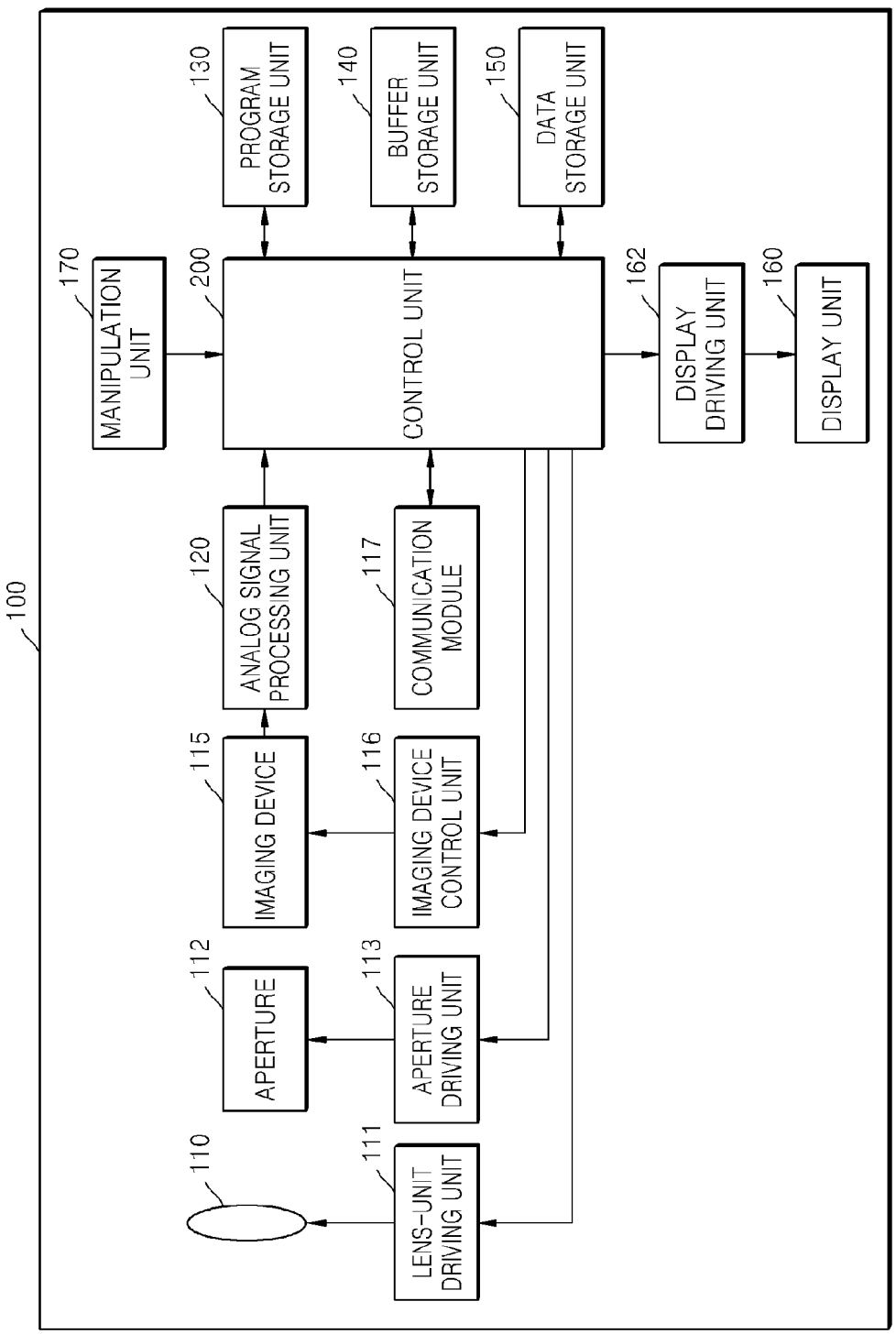
FIG. 1 is a diagram illustrating a schematic structure of a digital photographing apparatus, according to an embodiment.

Hereinafter, embodiments will be described in detail with reference to the attached drawings. Those components that are the same or are in correspondence are rendered the same reference numeral regardless of the figure number, and redundant explanations are omitted.

Figure 2:
FIG. 2 is a diagram illustrating communication between the digital photographing apparatus of FIG. 1 and a remote control terminal, according to another embodiment.

FIG. 1 is a diagram illustrating a schematic structure of a digital photographing apparatus 100, according to an embodiment. FIG. 2 is a diagram illustrating communication between the digital photographing apparatus of FIG. 1 and a remote control terminal 300, according to another embodiment Referring to FIGS. 1 and 2, the digital photographing apparatus 100 may include a portable digital terminal such as a digital camera, a mobile phone, a smart phone, a personal digital assistant (PDA), a portable multimedia player (PMP), a camcorder, or the like. Also, the digital photographing apparatus 100 may have a function for remotely capturing an image of a target object and a function for compressing and transmitting a live view image to the remote control terminal 300 that remotely controls photographing, and captures the image of the target object according to a photographing control signal from the remote control terminal 300. These functions are referred to as a remote shutter, a remote viewfinder, or a live shutter, but are not limited to the aforementioned terms. To explain the digital photographing apparatus 100 in more detail, a case in which a camera is fixed and a smart phone performs wireless communication with the camera to capture an image will be described. In this case, the smart phone may be the remote control terminal 300 of FIG. 2, and the camera may be the digital photographing apparatus 100. Conversely, the smart phone may be the digital photographing apparatus 100, and the camera may be the remote control terminal 300. That is, the remote control terminal 300 may be a portable terminal such as a mobile phone, a smart phone, or the like that may capture an image of a target object by performing wireless communication with the digital photographing apparatus 100, e.g., a digital camera. When the digital photographing apparatus 100 is powered on and ready to capture an image of a target object, the digital photographing apparatus 100 transmits a live view image to the remote control terminal 300, and captures the image of the target object according to a photographing control signal from the remote control terminal 300, e.g., according to a signal indicating photographing, that is, a signal corresponding to a shutter release signal of the digital photographing apparatus 100. Before the digital photographing apparatus 100 receives the photographing control signal, the live view image of the target object may be displayed on a display unit, e.g., a liquid crystal display (LCD), of each of the digital photographing apparatus 100 and the remote control terminal 300. Here, power consumption of the digital photographing apparatus 100 may be reduced by analyzing an I-frame, a P-frame, or a B-frame, or a combination of these frames, wherein these frames are compressed frames of the live view image compressed and transmitted by the digital photographing apparatus 100, and then by aborting the continuous display of the live view image on the digital photographing apparatus 100. A detailed configuration for reducing the power consumption by analyzing the compressed frames and then by controlling the display of the digital photographing apparatus 100 will be described later with reference to FIGS. 3 and 4.

Referring back to FIG. 1, the digital photographing apparatus 100 may include a lens unit 110, a lens-unit driving unit 111, an aperture 112, an aperture driving unit 113, an imaging device 115, an imaging device control unit 116, an analog signal processing unit 120, a program storage unit 130, a buffer storage unit 140, a data storage unit 150, a display driving unit 162, a display unit 160, a control unit 200, and a manipulation unit 170. Here, the lens unit 110, the lens-unit driving unit 111, the aperture 112, the aperture driving unit 113, the imaging device 115, the imaging device control unit 116, and the analog signal processing unit 120 may be referred to as an image capturing unit.

The lens unit 110 focuses an optical signal. The lens unit 110 may include a zoom lens for controlling an angle of view to be relatively small or relatively large according to a focal length, and a focus lens for adjusting a focus of the target object. Each of the zoom lens and the focus lens may be formed of one lens or may be formed of a group of a plurality of lenses. The aperture 112 is opened or closed to adjust emission intensity of incident light. The lens-unit driving unit 111 and the aperture driving unit 113 receive a control signal from the control unit 200, thereby driving the lens unit 110 and the aperture 112, respectively. The lens-unit driving unit 111 adjusts the focal length by adjusting positions of the lenses, and performs operations such as auto-focusing, zoom change, focus change, or the like. The aperture driving unit 113 adjusts the opening and closing of the aperture 112, and particularly, the aperture driving unit 113 performs operations including auto-focusing, auto-exposure compensation, the focus change, target object depth adjustment, or the like by adjusting an f-number or a value of the aperture 112.

The optical signal that passes through the lens unit 110 reaches a light-receiving surface of the imaging device 115 and then forms an image of the target object. The imaging device 115 may include a charge coupled device (CCD), a complementary metal oxide semiconductor image sensor (CIS), or a high-speed image sensor to convert the optical signal into an electrical signal. International Organization for Standardization (ISO) sensitivity of the imaging device 115 may be adjusted by the imaging device control unit 116. The imaging device control unit 116 may control the imaging device 115 according to a control signal that is automatically generated by an image signal input in real-time, or according to a control signal that is manually input by user manipulation. An exposure time of the imaging device 115 is adjusted by using a shutter (not shown). The shutter may be a mechanical shutter for adjusting incident light by moving a screen, or an electronic shutter for controlling exposure according to supply of an electrical signal to the imaging device 115. The analog signal processing unit 120 performs noise reduction processing, gain adjustment, waveform correction, analog-to-digital conversion, or the like on an analog signal supplied from the imaging device 115.

A communication module 117 may perform WiFi communication or short-distance communication within a range of several to several tens of centimeters, and may exchange data with the remote control terminal 300 via wireless communication according to control by the control unit 200. Also, the communication module 117 transmits the compressed frames obtained by compressing the live view image to the remote control terminal 300, and receives the photographing control signal from the remote control terminal 300.

The manipulation unit 170 may receive a control signal from an external source such as a user. The manipulation unit 170 may include a shutter-release button for inputting the shutter release signal so as to capture the image of the target object by exposing the imaging device 115 to external light for a predetermined time period; a power button for inputting a control signal so as to power on or off the digital photographing apparatus 100; a wide angle-zoom button and a telephoto-zoom button for making the angle of view relatively small or relatively large according to an input; and various function buttons for selecting modes such as text input, photographing, or reproduction, or for selecting a white balance setting function, an exposure setting function, or the like. However, the manipulation unit 170 is not limited to a button type unit and thus may be embodied as a keyboard, a touchpad, a touchscreen, a remote controller, or the like by which a user may input a command.

The digital photographing apparatus 100 includes the program storage unit 130, which stores a program such as an operating system and an application system for driving the digital photographing apparatus 100; the buffer storage unit 140, which temporarily stores data that is required for performing calculations, and result data; and the data storage unit 150, which stores a plurality of pieces of various information necessary for the program, e.g., an image file including an image signal.

The digital photographing apparatus 100 includes the display unit 160, which displays a state of the digital photographing apparatus 100, or displays still image data or moving picture data captured by the digital photographing apparatus 100. The display unit 160 may provide a user with video information and audio information. In order to provide the video information, the display unit 160 may be formed of a liquid crystal display (LCD) panel, an organic light-emitting display panel, or the like. The display driving unit 162 provides a driving signal to the display unit 160. Also, the digital photographing apparatus 100 controls powering off of the display unit 160 by analyzing the compressed frames to be transmitted to the remote control terminal 300.

The digital photographing apparatus 100 includes the control unit 200, which processes an input image signal and controls each element of the digital photographing apparatus 100 according to the input image signal or an external input signal. The control unit 200 may be formed as a digital signal processing (DSP) chip. The control unit 200 may perform noise reduction processing on input image data and may perform image signal processing on the input image data so as to improve image quality, wherein the image signal processing includes gamma correction, color filter array interpolation, color matrix, color correction, color enhancement, or the like. Also, the control unit 200 may generate an image file by compressing image data generated by performing the image signal processing, or may restore the image data from the image file. An image compression format may be a reversible format or an irreversible format. The compressed data may be stored in the data storage unit 150.

In order to transmit the compressed frames to the remote control terminal 300, the digital photographing apparatus 100 includes a moving picture codec by which the live view image of the target object is compressed. Here, the moving picture codec according to H.264 is described but is not limited thereto and may be a compression codec according to Moving Picture Experts Group (MPEG)-4, MPEG-2, or H.263.

The compression of the live view image generates a reference frame that is encoded after passing through motion estimation, motion compensation, discrete cosine transform (DCT), and quantization, and that is to be compared with a next frame after passing through inverse-DCT, inverse-quantization, and a selective deblocking filter.

Also, the control unit 200 may execute the program stored in the program storage unit 130, may include a separate module so as to generate a control signal for controlling the auto-focusing, the zoom change, the focus change, the auto-exposure compensation, or the like, may provide the control signal to the lens-unit driving unit 111, the aperture driving unit 113, and the imaging device control unit 116, and may generally control operations of configured elements such as the shutter, a flash, or the like included in the digital photographing apparatus 100.

Figure 3:
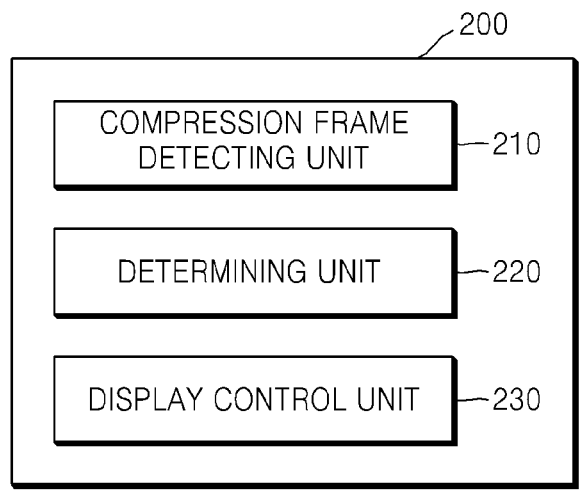
FIG. 3 is a diagram describing a control unit of the digital photographing apparatus of FIG. 1, according to another embodiment.

FIG. 3 is a diagram describing the control unit 200 of the digital photographing apparatus 100 of FIG. 1, according to another embodiment.

Referring to FIG. 3, the control unit 200 includes a compression frame detecting unit 210, a determining unit 220, and a display control unit 230. Here, the control unit 200 is an embodiment of a DSP unit in the claims.

The compression frame detecting unit 210 detects the number of I-frames from among frames of a compressed image obtained by compressing an input image of a target object. Also, the compression frame detecting unit 210 may detect the number of P-frames or B-frames.

Here, an I-frame, or an I-picture, indicates an intra-encoded image, that is, an encoded frame image; a P-frame, or a P-picture, indicates a prediction encoded image, that is, a forward inter-frame prediction encoded image; and a B-frame, or a B-picture, indicates a bidirectional prediction encoded image. The I-frame is a frame encoded according to only corresponding screen information, and is generated without using inter-prediction. In a group of pictures (GOP), at least one I-frame is required to perform random access, and the I-frame may only include intra macroblocks. The P-frame is generated by performing prediction from the I-frame or another P-frame, and the P-frame may include intra macroblocks and inter macroblocks. The B-frame is a frame generated by performing bidirectional prediction, and the B-frame may include intra macroblocks, forward inter-frame macroblocks, backward inter-frame macroblocks, and interpolative inter-frame prediction macroblocks according to forward and backward prediction.

Figure 4:
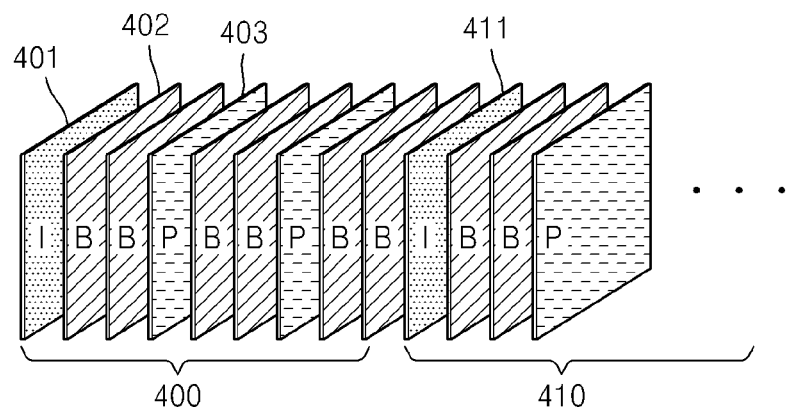
FIG. 4 illustrates structures of frames of a compressed live view image to be transmitted to the remote control terminal 300 from the digital photographing apparatus of FIG. 1, according to another embodiment.

FIG. 4 illustrates structures of frames of a compressed live view image to be transmitted to the remote control terminal 300 from the digital photographing apparatus 100, according to another embodiment. Here, reference numeral 400 indicates a first GOP, and reference numeral 410 indicates a second GOP. The first GOP is formed of combination of an I-frame 401, a B-frame 402, and a P-frame 403, and the I-frame 401 is positioned at a start of the first GOP.

The determining unit 220 determines whether the number of detected I-frames is less than a first threshold value. That is, if the number of detected I-frames is less than the first threshold value, the determining unit 220 may determine that a screen change is small, and if the number of detected I-frames is equal to or greater than the first threshold value, the determining unit 220 may determine that a screen change is large.

In a case where the number of detected I-frames is less than the first threshold value, the display control unit 230 turns off the display of the digital photographing apparatus 100. The turning off of the display of the digital photographing apparatus 100 is performed by the control unit 200 of the digital photographing apparatus 100, but the turning off of the display may be performed by the remote control terminal 300 transmitting a remote control signal to the digital photographing apparatus 100 according to the determination with respect to the number of I-frames.

For example, the number of I-frames from among frames of a compressed image transmitted to the remote control terminal 300 is detected; if the number of detected I-frames is less than the first threshold value, a power off control signal for turning off the display of the digital photographing apparatus 100 is generated; and when the power off control signal is transmitted as a remote control signal to the digital photographing apparatus 100, the display control unit 230 of the control unit 200 receives the power off control signal and turns off the display of the digital photographing apparatus 100. That is, the compression frame detecting unit 210 and the determining unit 220 may be included in the remote control terminal 300.

The control unit 200 detects the number of I-frames from among the frames of the compressed image obtained by compressing the input image of the target object, and controls power of the digital photographing apparatus 100 according to the number of detected I-frames. Here, according to the power control, the digital photographing apparatus 100 may enter a power saving mode, and the display of the digital photographing apparatus 100 may be turned off. If it is determined that it is not necessary to constantly display the live view image on the display unit 160, the display unit 160 is turned off, so that power consumption of the digital photographing apparatus 100 is reduced. For example, in a case where a camera is fixed, and an image is captured by using a smart phone, if people are not around the fixed camera or an LCD of the camera but are around a lens of the camera, the LCD is turned off and then the camera enters a power saving mode so that power of a battery of the camera is conserved. Also, in a case where a user leaves the camera alone for a while, the camera enters the power saving mode without a specific event.

Here, when a moving picture is compressed and transmitted, the I-frame is first transmitted and afterward, when a change of an image is great, the I-frame is transmitted again. However, in order to decrease a data transmission amount, only partial data of the I-frame, partial data of the B- and P-frames, and changed portions thereof may be transmitted so that an actual amount of transmission is significantly decreased.

If the I-frame is continually received in a predetermined time period, the control unit 200 determines that a screen change is great and thus photographing may not be performed yet. On the other hand, if the I-frame is not received but only the B- or P-frame is received in a predetermined time period or a short interval, the control unit 200 determines that photographing may be performed since a screen is in an almost still state. Also, if only the B- or P-frame is received in a time period greater than the predetermined time period, the control unit 200 may determine that a camera has been left alone or photographing has been completed. In this case, the control unit 200 turns off the display unit 160, and maintains the off state until occurrence of a specific event by a user, e.g., an operation of turning on the display unit 160.

Figure 5:
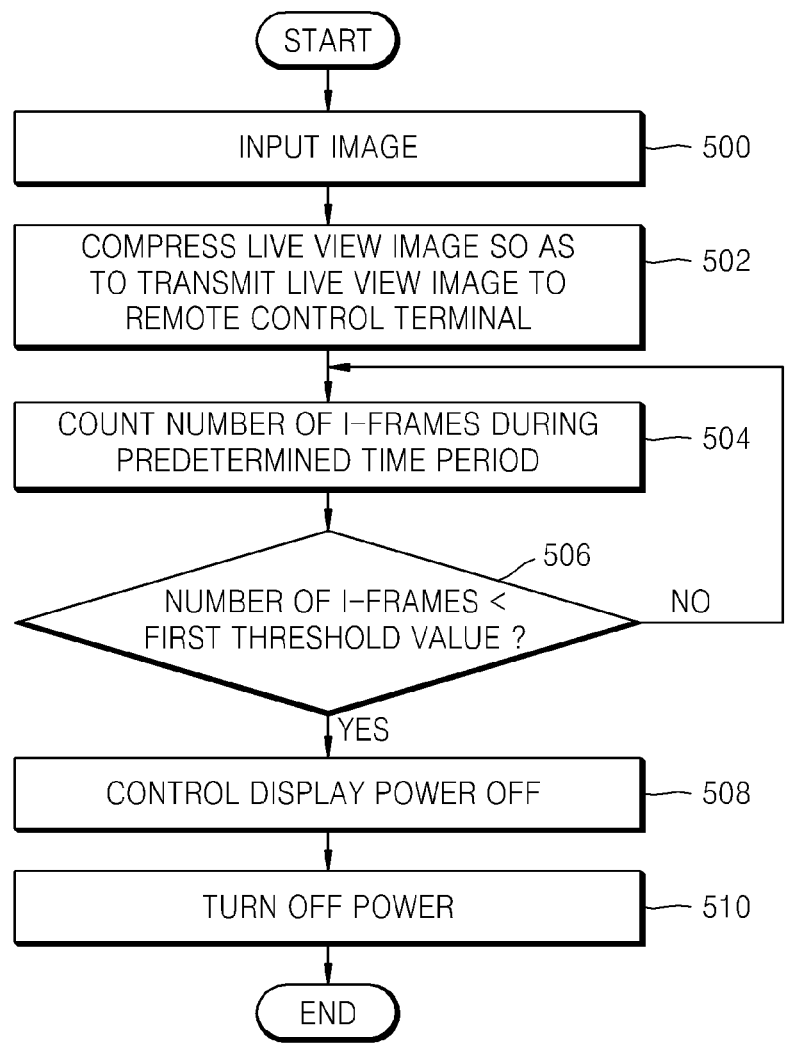
FIG. 5 is a flowchart for describing a method of controlling power of the digital photographing apparatus of FIG. 1, according to an embodiment.

FIG. 5 is a flowchart for describing a method of controlling power of the digital photographing apparatus 100, according to an embodiment.

Referring to FIG. 5, the digital photographing apparatus 100 performs operations stated below. In operation 500, the digital photographing apparatus 100 receives an image of a target object. In operation 502, the digital photographing apparatus 100 compresses a live view image so as to transmit the live view image to the remote control terminal 300. In operation 504, the digital photographing apparatus 100 counts the number of compressed I-frames in a predetermined time period. Here, the predetermined time period may be arbitrary, e.g., 1 minute. That is, the number of compressed I-frames in 1 minute may be counted.

In operation 506, when the number of I-frames is less than a first threshold value, the digital photographing apparatus 100 proceeds to operation 508 and then controls powering off of a display of the digital photographing apparatus 100. In operation 510, the digital photographing apparatus 100 turns off the display. That is, a case in which the number of I-frames is less than the first threshold value corresponds to a case in which a screen change does not occur, and thus the digital photographing apparatus 100 determines that photographing may be performed or that the display is to be turned off since the digital photographing apparatus 100 has been left alone. In operation 506, when the number of I-frames is equal to or greater than the first threshold value, the digital photographing apparatus 100 returns to operation 504. That is, a case in which the number of I-frames is equal to or greater than the first threshold value corresponds to a case in which a screen change occurs, and thus the digital photographing apparatus 100 determines that photographing may not be performed yet and thus constantly displays the live view image. Here, the first threshold value may be arbitrarily determined. Also, the powering off of the display may be performed in a unit of a display block including the display unit 160 and the display driving unit 162 which are shown in FIG. 1.

FIG. 6 is a flowchart for describing a method of controlling power of the digital photographing apparatus 100, according to another embodiment. Unlike the method of FIG. 5, the method of FIG. 6 corresponds to a case in which detection of compressed frames, and determination with respect to turning off a display are performed by the remote control terminal 300.

Referring to FIG. 6, in operation 600, the digital photographing apparatus 100 receives an image of a target object, and in operation 602, the digital photographing apparatus 100 compresses a live view image so as to transmit the live view image to the remote control terminal 300.

In operation 604, the digital photographing apparatus 100 transmits a compressed image to the remote control terminal 300. In operation 606, the remote control terminal 300 counts the number of received I-frames in a predetermined time period.

In operation 608, when the number of I-frames is less than a first threshold value, in operation 610, the remote control terminal 300 transmits a control signal to the digital photographing apparatus 100 so as to turn off a display of the digital photographing apparatus 100, and in operation 612, the digital photographing apparatus 100 receives the control signal and thus turns off the display. In operation 608, when the number of I-frames is equal to or greater than the first threshold value, the method returns to operation 606.

FIG. 7 is a flowchart for describing a method of controlling power of the digital photographing apparatus 100, according to another embodiment.

Referring to FIG. 7, in operation 700, the digital photographing apparatus 100 receives an image of a target object. In operation 702, the digital photographing apparatus 100 compresses a live view image so as to transmit the live view image to the remote control terminal 300. In operation 704, the digital photographing apparatus 100 counts the numbers of compressed I-frames, B-frames, and P-frames in a predetermined time period. Here, the predetermined time period may be arbitrary, e.g., 1 minute. That is, the numbers of compressed I-frames, B-frames, and P-frames in 1 minute may be counted.

In operation 706, if the number of I-frames is less than a first threshold value, the digital photographing apparatus 100 proceeds to operation 708 and then determines whether the total of the number of B-frames and the number of P-frames is equal to or greater than half the number of frames to be transmitted in the predetermined time period. In operation 706, if the number of I-frames is equal to or greater than the first threshold value, the digital photographing apparatus 100 returns to operation 704. That is, in a case where the digital photographing apparatus 100 transmits the live view image to the remote control terminal 300 at a speed of 15 frames per second (fps), the total number of frames to be transmitted in 1 minute is 900 frames. In this case, it may be determined whether the total number of B- and P-frames is equal to or greater than 450 frames, and if the total number of B- and P-frames is equal to or greater than 450 frames, the digital photographing apparatus 100 may determine that a screen change is very small. Here, although it is determined whether the total number of B- and P-frames is equal to or greater than half a transmission frame rate, the reference standard may be arbitrarily determined and thus is not limited thereto.

In operation 708, in a case where the total number of B- and P-frames is equal to or greater than half of the number of frames to be transmitted in the predetermined time period, the digital photographing apparatus 100 proceeds to operation 710 and then controls powering off of a display of the digital photographing apparatus 100, and in operation 712, the digital photographing apparatus 100 turns off the display.

In operation 708, in a case where the total number of B- and P-frames is less than half the number of frames to be transmitted in the predetermined time period, the digital photographing apparatus 100 returns to operation 704. The control of powering off of the display by using the numbers of I-, B-, and P-frames of FIG. 7 may also be equivalently applied to the method of FIG. 6 in which detection of compressed frames and determination with respect to turning off a display are performed by the remote control terminal 300.

When the digital photographing apparatus is remotely controlled, the method of controlling power of the digital photographing apparatus according to the one or more embodiments may reduce power consumption of the digital photographing apparatus by analyzing image frames that are compressed and transmitted and then by determining a screen change in the image frames.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, DVDs, magnetic tapes, hard disks, floppy disks, and optical data storage devices. The computer readable recording media may also be distributed over network coupled computer systems so that the computer readable code is stored and executed in a distributed fashion. This media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method of controlling power of a digital photographing apparatus for photographing a target object according to a control signal from a remote control terminal, the method comprising:
    compressing an input image of the target object;
    detecting a number of at least one of I-frames, P-frames, and B-frames from among frames of the compressed input image in a first time period; and
    controlling the power of the digital photographing apparatus based on the number of the at least one of I-frames, P-frames, and B-frames.

2. The method of claim 1, further comprising:
    transmitting the compressed input image to the remote control terminal using the digital photographing apparatus;
    detecting the number of I-frames from among the frames of the compressed input image in a first time period using the remote control terminal;
    generating a power off control signal for turning off a display of the digital photographing apparatus when the number of I-frames is less than a first threshold value;
    transmitting the power off control signal to the digital photographing apparatus; and
    turning off the display according to the power off control signal.

3. The method of claim 1, wherein the detecting comprises detecting the number of I-frames from among the frames of the compressed input image in a first time period.

4. The method of claim 1, further comprising:
    determining whether the number of I-frames is less than a first threshold value; and
    determining whether a total of the number of P-frames and the number of B-frames is less than a second threshold value, and
    wherein, when the number of I-frames is less than the first threshold value and the total of the number of P-frames and the number of B-frames is less than the second threshold value, the controlling comprises turning off a display of the digital photographing apparatus.

5. The method of claim 4, wherein the second threshold value is determined according to a rate of frames to be transmitted to the remote control terminal.

6. The method of claim 4, further comprising determining whether the total of the number of P-frames and the number of B-frames in a second time period that is greater than the first time period is greater than or equal to a third threshold value, and
    wherein, when the total of the number of P-frames and the number of B-frames in the second time period is greater than or equal to the third threshold value, the controlling comprises turning off the display of the digital photographing apparatus.

7. The method of claim 1, wherein the input image comprises a live view image.

8. The method of claim 1, further comprising photographing the target object according to a photographing signal from the remote control terminal.

9. A non-transitory recording medium having recorded thereon a program for executing the method of claim 1 on a computer.

10. A method of controlling power of a digital photographing apparatus for photographing a target object according to a control signal from a remote control terminal, the method comprising:
   compressing an input image of the target object;
   detecting a number off I-frames from among frames of the compressed input image;
   determining whether the number of I-frames is less than a first threshold value; and
   controlling the power of the digital photographing apparatus based on the number of I-frames,
   wherein, when the number of I-frames is less than the first threshold value, the controlling comprises turning off a display of the digital photographing apparatus.

11. The method of claim 10, wherein, when the number of I-frames is less than the first threshold value, the controlling comprises:
   generating a power off control signal for turning off the display of the digital photographing apparatus; and
   turning off the display according to the power off control signal.

12. A digital photographing apparatus for photographing a target object according to a control signal from a remote control terminal, the digital photographing apparatus comprising:
   a digital signal processing (DSP) unit
      that detects a number of at least one of I-frames, P-frames, and B-frames from among frames of an image in a first time period, the image being obtained by compressing an input image of the target object, and
      that controls power of the digital photographing apparatus based on the number of the at least one of I-frames, P-frames, and B-frames.

13. The digital photographing apparatus of claim 12, further comprising:
   a communication module
      that transmits the compressed input image to the remote control terminal, and
      that receives a remote control signal from the remote control terminal,
   wherein the remote control terminal
      detects the number of I-frames from among the frames of the compressed input image received in a predetermined time period,
      generates a power off control signal for powering off a display of the digital photographing apparatus when the number of I-frames is less than a first threshold value, and
      transmits the power off control signal to the digital photographing apparatus as the remote control signal,
   wherein the DSP unit turns off the display according to the power off control signal.

14. The digital photographing apparatus of claim 12, wherein the input image comprises a live view image.

15. A digital photographing apparatus for photographing a target object according to a control signal from a remote control terminal, the digital photographing apparatus comprising:
   a digital signal processing (DSP) unit that detects a number of I-frames from among frames of an image obtained by compressing an input image of the target object and controls power of the digital photographing apparatus based on the number of I-frames,
   the digital signal processing (DSP) unit comprising:
      a compression frame detecting unit that detects the number of I-frames from among the frames of the image obtained by compressing the input image of the target object;
      a determining unit that determines whether the number of I-frames is less than a first threshold value; and
      a display control unit that turns off a display of the digital photographing apparatus when the number of I-frames is less than the first threshold value.

16. The digital photographing apparatus of claim 15, wherein the determining unit
   determines whether the number of I-frames is less than the first threshold value, and
   determines whether a total of the number of P-frames and the number of B-frames is less than a second threshold value,
   wherein the display control unit turns off the display of the digital photographing apparatus when the number of I-frames is less than the first threshold value and the total of the number of P-frames and the number of B-frames is less than the second threshold value.

17. The digital photographing apparatus of claim 16, wherein the second threshold value is determined according to a rate of frames to be transmitted to the remote control terminal.

18. The digital photographing apparatus of claim 16, wherein the determining unit determines whether the total of the number of P-frames and the number of B-frames in a second time period that is greater than the first time period is greater than or equal to a third threshold value, and
   wherein, when the total of the number of P-frames and the number of B-frames is greater than or equal to the third threshold value, the display control unit turns off the display of the digital photographing apparatus.

* * * * *